3,357,838
SOUR CREAM POWDER
Peter P. Noznick, Evanston, Ill., assignor to Beatrice Foods Co., Chicago, Ill., a corporation of Delaware
No Drawing. Filed Mar. 5, 1965, Ser. No. 437,551
18 Claims. (Cl. 99—56)

ABSTRACT OF THE DISCLOSURE

Cream, whole milk or skim milk is acidified at a temperature between the freezing point and 40° F. with a nontoxic acid and spray dried.

---

This application is a continuation-in-part of application Ser. No. 382,962 filed July 15, 1964 and now abandoned.

This invention relates to the preparation of sour cream powder.

In the conventional procedures for preparing sour cream powder the protein is coagulated prior to spray drying. As a result there is a reduction in protein efficiency.

It is an object of the present invention to develop an improved process of preparing sour cream.

Another object is to increase the efficiency of the cream protein in preparing a powdered sour cream.

A further object is to prepare a novel sour cream powder.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modification within the spirit and scope of the invention will become apparent to those skilled in the art from this detailed description.

It has now been found that these objects can be attained by spray drying an acidified cream having a temperature not over about 40° F. In this manner the protein (i.e. casein) content of the cream does not coagulate prematurely but instead coagulates immediately as the cold mix passes through the hot spray drier and there is obtained a spray dried sour cream powder wherein the fat particles are encased in the protein.

There can be employed as starting material regular cream having a butterfat content of 16 to 32%, e.g. 18%, 20% or 22%, with 18% being preferred. The cream is pasteurized in conventional fashion, e.g. at 150–160° F. and then is homogenized under conventional conditions, e.g. at 1500–2000 p.s.i. and a temperature of 100–160° F.

The pasteurized, homogenized cream is then cooled to a temperature of not over about 40° F. The temperature is normally kept above the freezing point of the water in the mix, hence temperatures of 32–40° F. are usually employed.

The cream is then acidified to the normal pH of sour cream, e.g. to a pH of 4 to 4.7, preferably a pH of 4.5 to 4.7. There can be employed any non-toxic acid (or mixture of acids) which is sufficiently strong to give the desired pH. Typical examples include lactic acid, citric acid, tartaric acid, monochloroacetic acid, hydrochloric acid, hydroiodic acid, phosphoric acid and hydrobromic acid. There is no need to use acid forming bacteria or other procedures which take time for the acid to develop.

It is essential that the acid be added to the cold cream, i.e. at a temperature not over about 40° F. since if higher temperatures are employed the acid will prematurely coagulate the protein.

Preferably there is added to the pasteurized, homogenized cream the conventional starter distillate flavor in an amount of 0.1–0.2% on the dry weight of the cream. The starter distillate can be added either before or after acidification.

The cold (not over 40° F.) acidified cream with or without the starter distillate as a flavoring agent is then spray dried in conventional manner, e.g. at an outlet temperature of 170–190° F. to give the final product.

As previously set forth as the cold acidified cream hits the hot spray drier, the protein content is instantaneously coagulated and a case hardened protein coating is formed around the fat to give a highly desirable powdered sour cream.

Unless otherwise indicated all parts and percentages are by weight.

Example 1

18% cream (18% butterfat content) is pasteurized at 155° F. for 30 minutes and is then homogenized at 150° F. and 1500 p.s.i. This mixture is then cooled to 38° F. and hydrochloric acid is then added to give a pH of 4.6. Then 0.15% starter distillate flavor (based on the dry weight of the mix) is added and the cold mixture (38° F.) is spray dried at a spray drier outlet temperature of 175–180° F. to give a spray dried sour cream powder of good flavor and consistency.

Example 2

The procedure of Example 1 was repeated but the hydrochloric acid was replaced by lactic acid to give a spray dried product in every way comparable with that of Example 1.

Example 3

The procedure of Example 1 was repeated but the pasteurized, homogenized cream was cooled to 36° F. prior to acidification and the acidified cream at this temperature was then spray dried.

Example 4

The procedure of Example 1 was repeated but the starter distillate was omitted. This gave a product with a flavor not quite as good as that of Example 1.

Example 5

The procedure of Example 1 was repeated but there was used a 22% cream. The spray dried product was similar to that of Example 1 but richer.

There can also be made a product analogous to sour cream according to the invention by replacing the cream starting material by whole milk, e.g. homogenized whole milk, or by using skim milk. When employing skim milk preferably condensed skim milk is employed because the spray drying can be carried out more rapidly. The whole milk or skim milk should of course be pasteurized to kill pathogenic bacteria.

Example 6

To 16 kilograms of condensed skim milk (30% total solids) there were added 500 cc. of 88% aqueous lactic acid at 35° F. The mixture was stirred thoroughly and had a pH of 4.65. It was then spray dried at a spray drier outlet temperature of 175–185° F.

When it is desired to obtain a cultured sour cream type product, skim milk or sweet buttermilk can be innoculated with flavor producing strains of bacteria such as: S. lactis, variety Citrovorous, and Paracitrovorous; S. creamoris; Leuconostoc; and incubated at 70–75° F. for 12–24 hours. When the proper acidity and flavor is reached, the temperature is lowered to 40° F. or below, but not below 32° F. and acid added. The acids may be any of the above named or combinations thereof. Then the product is combined with cream to give a product having the desired butterfat content and the non-fat milk solids normally found in cream, and the product is then spray dried.

Sweet buttermilk is obtained by the churning of cream to butter.

Cultured buttermilk is made by fermenting such buttermilk with flavor producing strains of acid-forming bacteria such as *S. lactis*.

Cultured skim milk is made by fermenting skim milk with flavor producing strains of acid-forming bacteria such as *S. lactis*.

*Example 7*

Sweet buttermilk was innoculated with *S. lactis* and Citrovorous and two-tenths percent citric acid and incubated at 70–72° F. for 14 hours and cooled to 40° F. Then lactic acid was added to standardize the pH of 4.6. 40° F. cream containing 36% butterfat was added in an amount sufficient to give a product having 18% butterfat, and the product spray dried.

The above example was repeated using skim milk and a mixture of skim milk and sweet buttermilk with equally satisfactory results.

The present invention can also be employed to obtain acid whey products. Thus we can add one part of whey of an acidity of 1% to one part of cream, containing 36% butterfat to yield an avid-flavored cream-type product containing 18% butterfat. By varying the ratio of whey to cream as from one-half to one, to two to one, cultured products can be obtained varying in flavor and acidity. Whey can be obtained in any conventional manner, e.g. draining the liquid from cottage cheese in its manufacture.

*Example 8*

Cream of 36% butterfat content was cooled to 35° F., and acid whey at 35° F. was added in an amount sufficient to reduce the butterfat content of the mixture to 18% and having a pH of 4.5. This mixture was then spray dried to give a novel whey-containing sour-cream-type of product.

While we prefer the spray drying in this invention to be carried out with a hot spray drier, it is also possible to spray dry using known spray driers at room temperature (for example: 70° F.).

What is claimed is:

1. A process of preparing a powdered sour cream type product comprising cooling a dairy product of the group consisting of cream, whole milk and skim milk to a temperature between the freezing point of said dairy product and 40° F., acidifying the cooled dairy product with a nontoxic acid and spray drying the acidified dairy product at a temperature not over 40° F. by passing it through a spray drier to form said powder.

2. A product prepared by the process of claim 1 said product being characterized by having the fat particles encased in the hardened protein coating and being free of acid forming bacteria.

3. A process according to claim 1 wherein the dairy product is acidified to a pH of 4 to 4.7.

4. A process of preparing powdered sour cream comprising cooling pasteurized, homogenized cream to a temperature between the freezing point of the cream and 40° F., acidifying the cooled cream with a nontoxic acid and spray drying the acidified cream at a temperature not over 40° F. by passing it through a spray drier to form a sour cream powder.

5. A process according to claim 4 wherein starter distillate is added to the cream prior to spray drying.

6. A process according to claim 5 wherein the cream is acidified to a pH of 4 to 4.7.

7. A process according to claim 6 wherein the cream has a butterfat content of 16 to 22%.

8. A process according to claim 7 wherein the cream has a butterfat content of 18%.

9. A process according to claim 8 wherein the cream is acidified to a pH of 4.0 to 4.7.

10. A process of preparing a powdered acidified skim milk product comprising cooling skim milk to a temperature between the freezing point of the skim milk and 40° F., acidifying the cooled skim milk with a nontoxic acid and spray drying the acidified skim milk at a temperature not over 40° F. by passing it through a spray drier to form an acidified skim milk powder.

11. A process according to claim 10 wherein the skim milk is acidified to a pH of 4 to 4.7.

12. A process according to claim 10 wherein the skim milk is condensed skim milk.

13. A process according to claim 12 wherein the skim milk is acidified to a pH of 4 to 4.7.

14. A process of preparing powdered sour cream comprising pasteurizing cream of a butterfat content of 16 to 36%, homogenizing the cream, cooling the pasteurized, homogenized cream to 32 to 40° F., acidifying the cream with a nontoxic acid to a pH of 4 to 4.7 while maintaining the temperature at 32 to 40° F., passing the acidified cream at a temperature of 32 to 40° F. and through a spray drier having an outlet temperature of 170 to 190° F. to produce a sour cream powder.

15. A process according to claim 14 wherein starter distillate is added to the cream prior to spray drying.

16. A process according to claim 15 wherein the acid is hydrochloric acid.

17. A process according to claim 15 wherein the acid is lactic acid.

18. The process comprising adding acid at a temperature up to 40° F. to a mixture of (1) a member selected from the group consisting of sweet buttermilk, skim milk, and mixtures thereof and (2) cream to give a product having a pH between 4.0 to 4.7 and spray drying the cold acid mixture at a temperature of not over 40° F. to form a sour cream type product.

References Cited

UNITED STATES PATENTS

| 2,009,135 | 7/1935 | Grelck | 99—59 |
| 2,604,403 | 7/1952 | Wiechers | 99—55 |
| 2,832,687 | 4/1958 | Lane et al. | 99—59 |
| 3,090,688 | 5/1963 | Noznick et al. | 99—56 |

FOREIGN PATENTS 677,531    8/1952    Great Britain.

LIONEL M. SHAPIRO, *Primary Examiner.*